US007546581B2

(12) United States Patent
Wainwright

(10) Patent No.: US 7,546,581 B2
(45) Date of Patent: Jun. 9, 2009

(54) USING CONTEXT PREFIXES THAT CORRESPOND TO USER INPUT MODES TO CONTROL EXECUTION OF SCRIPTING LANGUAGE

(75) Inventor: John Wainwright, Los Gatos, CA (US)

(73) Assignee: Autodesk, Inc., San Rafael, CA (US)

( * ) Notice: Subject to any disclaimer, the term of this patent is extended or adjusted under 35 U.S.C. 154(b) by 606 days.

(21) Appl. No.: 11/066,851

(22) Filed: Feb. 24, 2005

(65) Prior Publication Data

US 2005/0144589 A1 Jun. 30, 2005

Related U.S. Application Data

(63) Continuation of application No. 09/425,444, filed on Oct. 22, 1999, now Pat. No. 6,889,374.

(60) Provisional application No. 60/105,512, filed on Oct. 23, 1998.

(51) Int. Cl.
*G06F 9/44* (2006.01)
*G06F 9/45* (2006.01)
*G09G 5/00* (2006.01)

(52) U.S. Cl. ....................... 717/115; 717/105; 717/110; 717/113; 717/138; 715/964; 345/949; 345/956; 345/653; 345/664

(58) Field of Classification Search ................. 717/115, 717/134, 135, 138, 113, 105; 715/964, 704; 345/949, 956, 653, 654
See application file for complete search history.

(56) References Cited

U.S. PATENT DOCUMENTS

| | | | | |
|---|---|---|---|---|
| 5,909,218 A * | 6/1999 | Naka et al. | .................. | 345/419 |
| 5,999,186 A * | 12/1999 | Jackson | ...................... | 345/420 |
| 6,105,036 A * | 8/2000 | Henckel | .................. | 707/104.1 |
| 6,245,982 B1 * | 6/2001 | Suzuki et al. | ............. | 84/477 R |
| 6,308,146 B1 * | 10/2001 | La Cascia et al. | ............. | 703/22 |
| 6,310,619 B1 * | 10/2001 | Rice | ........................... | 345/420 |
| 6,326,963 B1 * | 12/2001 | Meehan | ...................... | 345/419 |
| 6,426,745 B1 * | 7/2002 | Isaacs et al. | ................ | 345/419 |

* cited by examiner

*Primary Examiner*—Insun Kang
(74) *Attorney, Agent, or Firm*—Patterson & Sheridan, LLP

(57) ABSTRACT

A mechanism for incorporating user input modes in a scripting language are provided for. A context allows use of user input modes in a scripting language in a manner that corresponds to their use in a GUI. A programming construct, referred to as a context, specifies at least one user input mode and a state for the user input mode that are applied to a set of instructions. The operations specified by the instructions that are referenced by a context are executed as if the user input modes referred to by the contexts have the state specified by the contexts.

20 Claims, 4 Drawing Sheets

Script 200

Script 200

210 - animate on move $box01 [20,0,0]

220 - animate on, at time 0 move $box01 [20,0,0]

230 — animate on ( ←231
block 232 — { move $box01 [20,0,0]  —234
                move $box02 [20,0,0]  —236
             )
             ↘239
241
240 - coord sys world (
    242 — rotate $floor01 45 x-axis
        coord sys local (
    244     rotate $box01 45 x-axis  ⎫
            ⋮                         ⎬ 250
            rotate $box01 45 x-axis  ⎭
                                        260
    248 — rotate $tree01 45 x-axis
            coord sys $floor01
    246     rotate $mop01 - 45 x-axis
        )

Script 300

```
310    set about amusement _ride_pivot

320    rotate $carousel01 45  y-axis

330    about local (
              rotate $carousel01/rider 01 90  y-axis
       335       :
              )
340    rotate $carousel02 45  y-axis
```

FIG. 3

USING CONTEXT PREFIXES THAT CORRESPOND TO USER INPUT MODES TO CONTROL EXECUTION OF SCRIPTING LANGUAGE

This continuation patent application claims priority from U.S. patent application Ser. No. 09/425,444, filed on Oct. 22, 1999, now patented, U.S. Pat. No. 6,889,374, titled USING CONTEXT PREFIXES THAT CORRESPOND TO USER INPUT MODES TO CONTROL EXECUTION OF SCRIPTING LANGUAGE, which claims priority from U.S. Provisional Patent Application No. 60/105,512, filed on Oct. 23, 1998, entitled 3-D MODELING THROUGH A SCRIPTING LANGUAGE. The parent U.S. patent application Ser. No. 09/425,444 and the provisional patent application 60/105,512 are hereby incorporated by reference in their entireties.

FIELD OF THE INVENTION

The present invention relates to applications that use GUI interfaces, and in particular, to applications that may execute scripts written in a scripting language that define instructions that correspond to user input that may be entered through a GUI.

BACKGROUND OF THE INVENTION

Computer generated 3-D animations enrich a wide range of human experience, captivating audiences at the movie theaters, gluing gamers to their personal computers, and embarking home buyers on virtual tours of new homes. To generate 3-D animations, a 3-D designer creates 3-D computer models of the entities using computer aided design systems (CAD). These models are used to emulate the movement, color, and shape of animated entities, from a dancing baby to space ships trekking through the universe.

3-D models are often composed of graphical components that represent the shapes and surfaces that make up modeled objects. A graphical component is a set of data, procedures, or a combination thereof, used to represent a geometry, such as a curve on the surface of a car. A graphical component may consist of multiple other graphical components, to represent more complex geometry, such as a car or human individual.

3-D models are built by users using a Computer Aid Design ("CAD") system. The user enters commands and data into the CAD system, and in response, the CAD system generates graphical components. Typically, a user enters commands and data through a graphical user interface ("GUI").

A GUI is a visual display that allows a user to enter commands and data into a computer system by using user input devices, such as a mouse, to manipulate and interact with user interface controls such as a window, a button, a dialogue box, and graphics that represent graphical components. Typically, a graphical user interface used in a CAD system includes a display in which graphical components are "interactively rendered". The term interactively rendered refers to responding to user input by updating the display of the graphical components to reflect the user input. Even more, a user may modify graphical components by using an input device to manipulate the rendered graphical components. Thus, the GUI enables users to visualize the graphical components they create and edit.

For example, a user modifies the graphical components depicting a human standing in a room. To change the position of the human within the room, a user uses a mouse to drag the human to a new position within the room. To turn the human around so the human is facing the opposite direction, the user uses the mouse to rotate the human.

GUIs are used to create frames for animations. A frame is the state of a set of graphical components at a particular point in time. Animations are generated by displaying a sequence of frames at a particular frequency, such as thirty times per second. For example, a sequence of frames may be used to animate marbles rolling across the room from the left side of the room to the right. Each frame of the sequence would include a graphical component for each of the marbles. In the first frame, the marbles are at the far left of the room. In the second frame, the marbles are positioned a little closer to the right, and so forth. The marbles are rendered in positions that are shifted in each of the frames, which are displayed in rapid sequence to animate the marbles rolling across the room.

To generate a sequence of frames, a user through the GUI interface on a CAD system, may generate data specifying the state of a subset of the frames referred to as key frames. Subsets of frames are logically interleaved between key frames. The CAD system renders the frames between successive key frames by interpolating the state of graphical components in each of the pair of key frames. For example, a user creates a sequence of key frames by using the GUI to establish the position of each of the marbles in the room, storing data for a key frame, then dragging each of the marbles to their next position, and storing data for another key frame, and repeating these manipulations for each of the remainder of the key frames.

Consequently, to generate a sequence of frames, a user may repetitively perform the same GUI manipulations, as illustrated above. Often, user input that is created by repetitively performing the same kinds of manipulations may be entered more efficiently through the use of a scripting language. A scripting language is computer language that contains instructions that correspond to user input that may be entered through a GUI. This allows users of CAD systems, with little or no training in programming, to develop scripts because the scripting language defines instructions that correspond to ways of entering input through a GUI that are familiar to the user. In addition, the scripting language, like computer languages in general, define control constructs that may be used to control the execution of programs written in a scripting language ("scripts"), including instructions for automatically repeating the execution of a set of instructions, such as a for loop. For example, the following script EX illustrates how lines of instructions may be written in a scripting language to input commands and data more efficiently into a CAD system.

```
for fr in 1 to 1000 by 10 do (
    delta+=5
    create_frame(fr)
    move marble1.position(delta,0,0,fr)
    move marble2.position(delta,0,0,fr)
    move marble3.position(delta,0,0,fr)
    move marble4.position(delta,0,0,fr)
    move marble5.position(delta,0,0,fr)
    store_in_frame(fr)
    )
```

The for loop in script EX is repeated 100 times to create key frames used to animate marbles accelerating across the room. During each iteration, the scripting language specifies that:

(1) a new frame should be created that is associated with the time interval represented by integer fr, (2) five marbles should be moved across the room along the X axis for 100 units at a distance represented by delta, which is increased during each iteration, (3) the new position of each of the five should be recorded in the key frame by storing data associated with the frame fr.

Using text editors, which typically have copy and paste capabilities, creating and running instructions written in a scripting language can be accomplished much more quickly than manually entering corresponding commands through a GUI.

A limitation of conventional scripting languages is that they do not provide instructions or constructs that correspond to all types of user input that may be entered through a GUI. Because certain types of user inputs are not supported by a scripting language, developers of scripts implement work-arounds, which are often undesirably complex and especially burdensome to program.

One type of user input that is not supported by a scripting language is input that specifies a user input mode. A user input mode may have multiple states, each of which affects how other user input is interpreted by a CAD system. A working coordinate system is an example of a user input mode. The state of the working coordinate system determines what coordinate system is relevant to performing operations that depend on a coordinate system. These states include, for example, WORLD, which corresponds to the world's coordinate system, and LOCAL, which corresponds to the coordinate system that is relative to a particular graphical component upon which an operation is performed ("local coordinate system"). If user input specifies that an object should be rotated about the x-axis, and the working coordinate system is set to WORLD, then the object is rotated around a line that intersects the center of the object and runs parallel to the world's x-axis. If the working coordinate system is LOCAL, then the object is rotated around a line that intersects the center of the object and runs parallel to the object's x-axis, which may not run parallel to the world's x-axis.

In addition, the working coordinate system may be set to a relative state. A relative state specifies a particular graphical component's local working coordinate system. When the working coordinate system is set to a relative state based on a graphical component's local coordinate system, operations specified by user input that depend on a coordinate system are executed based on the particular graphical component's local coordinate system.

Because conventional scripting languages do not support the user input mode working coordinate system, writing scripts that specify operations that are performed relative to a coordinate system can be very complex and tedious. Script developers may have to program formulas to calculate a graphical component's position based on another graphical component's position. Some of the formulas may be extraordinarily complex, even more extraordinarily difficult to program, and involve the application of mathematical principles beyond the training of many script developers.

Developing work-arounds for other user input modes can also be complex and tedious. Based on the foregoing, it is clearly desirable to provide a method which reduces the burden and complexity of developing scripts that provide the functionality provided by user input modes.

SUMMARY OF THE INVENTION

A mechanism for incorporating user input modes in a scripting language. According to an aspect of the present invention, a context allows use of user input modes in a scripting language in a manner that corresponds to their use in a GUI. A programming construct, referred to as a context, specifies at least one user input mode and a state for the user input mode that are applied to a set of instructions. The operations specified by the instructions that are referenced by a context are executed as if the user input modes referred to by the contexts have the state specified by the contexts.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 depicts a script used to illustrate an embodiment of the present invention.

DETAILED DESCRIPTION OF THE PREFERRED EMBODIMENT

A method and apparatus for executing a scripting language is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Overview

Described herein is a mechanism for incorporating user input modes in a scripting language. A context allows use of user input modes in a scripting language in a manner that corresponds to their use in a GUI. A context is an instruction that specifies at least one user input mode and a state for the user input mode. The user input mode state is applied to a set instructions written in a scripting language.

Exemplary Cad System

Figure 1:
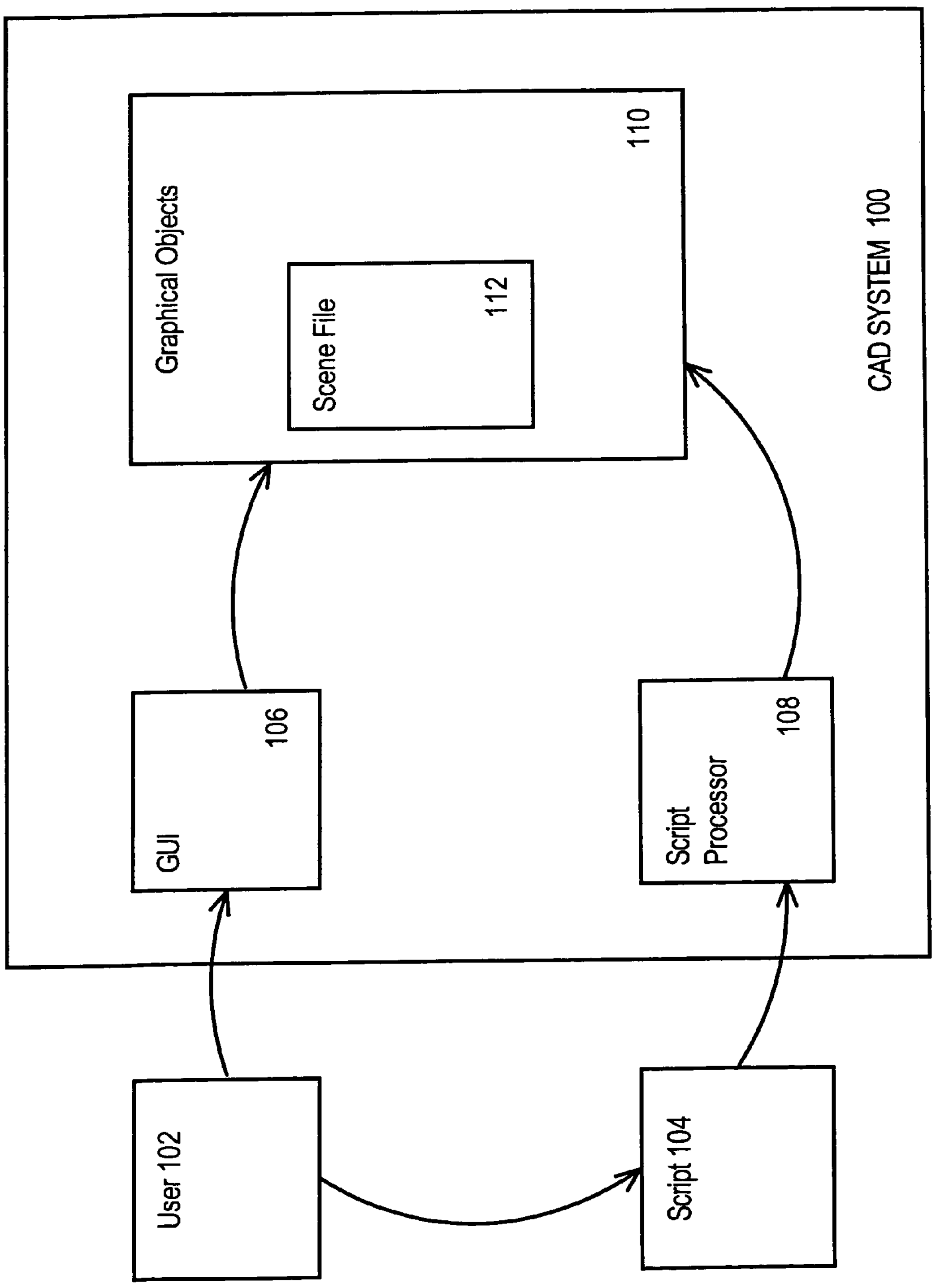
FIG. 1 is a block diagram depicting a CAD system according to an embodiment of the present invention.

FIG. 1 is a block diagram that depicts a user 102, and an exemplary CAD system 100 upon which an embodiment of the present invention may implemented. User 102 may interact with GUI 106 to create graphical objects 110 in CAD system 100. Graphical objects 110 include scene file 112. A scene file is a file that stores data representing an animation. A scene file may include, for example, data defining graphical objects composing a scene, key frames and the pose and position of each graphical object in the key frame.

User 102 may also generate one or more scripts and store them in script 104 using standard utilities, such as text editors. User 102 then submits script 104 for execution by script processor 108. Script processor 108 interprets script 104, and causes CAD system 100 to create graphical objects 110 as specified by the interpreted scripts.

Use of a script file that contains scripts created by a user is not required by the techniques described herein. CAD system 100 may process scripts produced from any source of data.

For example, the scripts in script 104 may be generated automatically by an application that translates graphical data representing a city into scripts. Alternatively, a CAD system 100 may process scripts received as a stream data over a network.

Exemplary Graphical User Interface

User input modes are emulated through the use of constructs defined for a scripting language. To illustrate how user input modes may be supported in this manner, the following set of exemplary user input modes supported through GUI 106, is provided.

Working Coordinate System: The GUI provides a graphical control for selecting a working coordinate system.

Animate: This user input mode has two states—ON or OFF. While the state is ON, user input received that alters the state of a graphical component is processed as user input that specifies the state of a graphical component for a key frame. For example, a user is changing the position of graphical components that each represent a human within a room. Specifically, for each graphical component, the user drags the display of the respective human to a new position within the room. If the animate state is ON, then as each human is placed in their respective new position, the CAD system generates data recording the new position of the human for a key frame. If the state is OFF, the new position of each of the humans is not recorded in a key frame. A user may control the animate state through the GUI by manipulating a graphical control button, herein referred to as the animate button.

Frame Time: The state of this user input mode corresponds to a time interval. While the animate button is ON, any data generated for a key frame is generated for a key frame that is associated with the time interval specified by the state of frame time. A user may control the state of frame time through the GUI by manipulating a slider graphical control, herein referred to as the time slider.

For purposes of illustration, consider a situation in which a user has manipulated the animate button so that the animate state is ON, and manipulated the time slider so that the frame time specifies 0. The user, through the GUI, creates a graphical component depicting objects in a room. During this process, the user enters user input that specifies the position of graphical components that each represent a human, positioning each at the right side of the room. In response, the CAD system generates data for a key frame 0 (i.e. the key frame associated with the time interval 0). The generated data specifies that the position of the human graphical component is at the right side of the room. Next, the user manipulates the time slider so that the frame time corresponds to 30, and the user drags the display of each human graphical component further to the left side of the room. In response to dragging each human, the CAD system generates data for a key frame 30 that specifies the further left position of each human graphical component.

Center Point: The state of this user input mode specifies a point. User input that specifies rotation of a graphical object or other operations based on a point are performed relative to the point specified by the state of center point. For example, the center point state may be set to SELECTED OBJECT. While center point is set to this state, whenever the CAD system receives user input entered through the GUI that specifies that a graphical component is to be rotated, the CAD system rotates the graphical component about the center of the selected object. The center point may be set to WORLD, which causes graphical components to be rotated around the center of the world coordinate system.

Context Blocks

Figure 2:
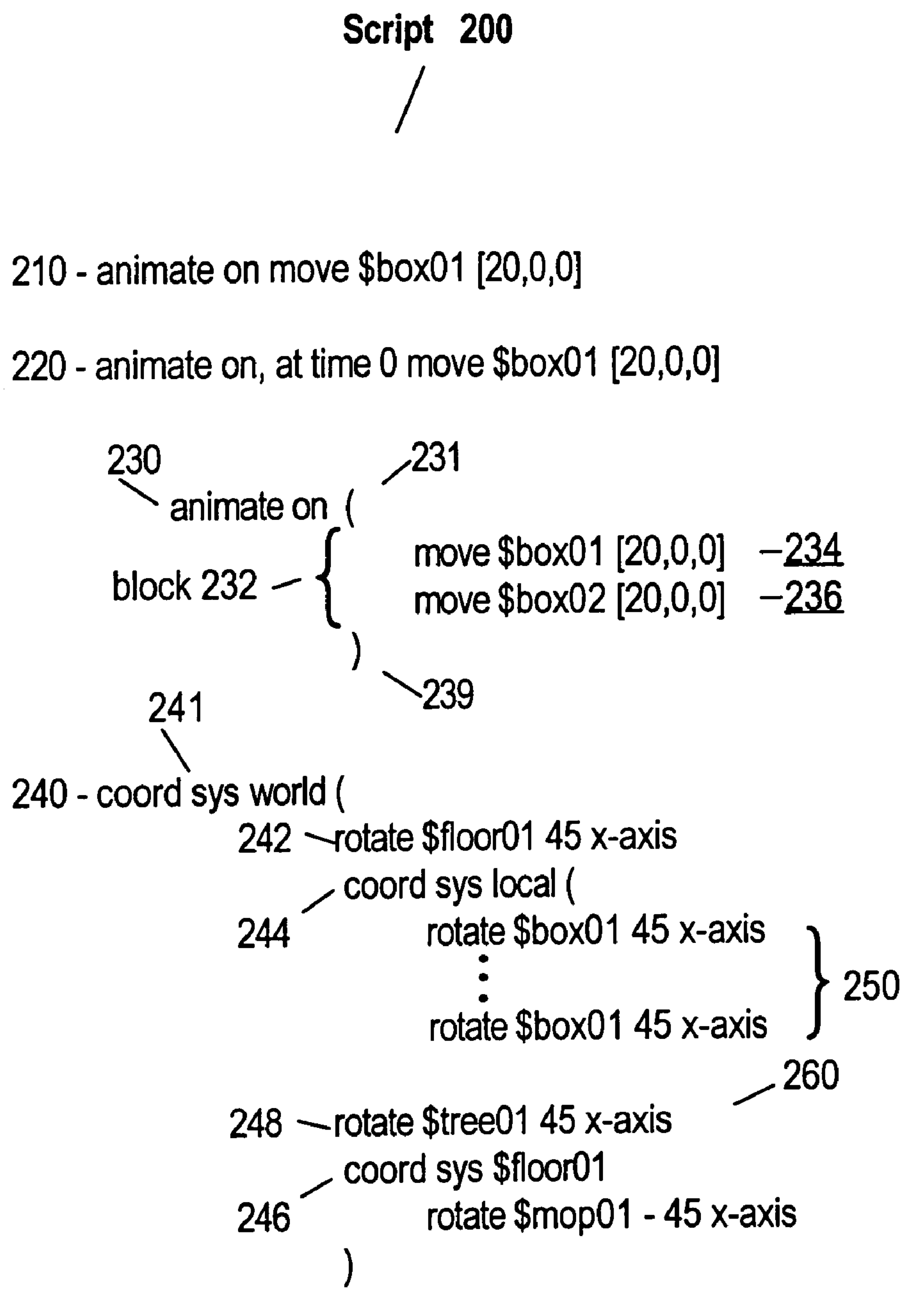
FIG. 2 depicts a script used to illustrate an embodiment of the present invention.

FIG. 2 depicts script 200, which is used to illustrate how context blocks may be used to apply user input modes to a set of instructions according to an embodiment of the present invention. According to one embodiment, a context block includes a context prefix and a context block expression that is associated with the context prefix, arranged within a script file according to the following syntax:

<context prefix><context block expression>

A "context prefix" specifies one or more contexts. A "context" includes at least one key word, defined as part of the syntax of a scripting language, that specifies a user input mode, and at least one key word or value that specifies a state for the user input mode. A context prefix references the context block expression that is associated with the context prefix. Similarly, each context in a context prefix references the context block expression that is associated with the context prefix. The term reference, as used with respect to contexts or context prefixes, refers to a context prefix appearing in such a manner within a program, that, according to the governing syntactic rules, the context prefix should be interpreted as being directed to a particular item, such as an expression.

A context block expression is unit of code that specifies one or more operations to perform with respect to one or more objects (e.g. graphical component, data structure, variables). The operations that are specified by a context block expression are executed as if the user input modes referred to by the contexts in the associated context prefix have the states specified by those contexts. When the operations that are specified by a context block expression are executed as if the user input modes referred to by the contexts in the associated context prefix have the states specified by those contexts, the context, the user input mode, or its state, are said to be "applied to" the context block expression.

Referring to FIG. 2, line 210 is an example of how a context block is used in a scripting language. In particular, line 210 contains a context prefix with the context "animate on", and the context block expression "move $box01 [20, 0, 0]". In the context "animate on", the key word "animate" refers to the animate user input mode, and "on" refers to the ON state for the animate user input mode. The context block expression "move $box01 [20, 0, 0]" specifies that a graphical component $box01 should be moved 20 units along the X axis. When line 210 is executed, CAD system 100 not only moves $box01 as specified, but generates data in a key frame specifying the new position of $box01, because the operations specified by line 210 are executed as if the state of the animate user input mode is ON.

A context prefix may contain more than one context. Each context in a context prefix that references a context block expression is applied to the context block expression. The contexts in a context prefix may be separated by a delimiter, such as a comma. Line 220 contains the context prefix "animate on, at time 0". Within this context prefix, the context "animate on" specifies that the "animate" user input mode is in the "on" state, and the context "at time 0" specifies that the key frame state is time interval 0.

Multi-Expression and Nested Context Block Expressions

According to one embodiment, a scripting language and interpreter are provided that allow scripts to specify that a set of expressions is to be treated as a single context block expression. Thus, the interpreter applies the same context prefix to all expressions in the set. Context block expressions that consist of multiple expressions are referred to as multi-expression context block expressions.

According to one embodiment, the script language includes characters that are used to specify the boundaries of the block of code that contains the expressions that belong to a multi-expression context block expressions. Referring to FIG. 2, context prefix 230 references multi-expression context block expression 232. Parenthesis 231 marks the beginning boundary of multi-expression context block expression 232, and parenthesis 239 marks the end boundary of multi-expression context block expression 232. CAD system 100 applies context prefixes to the context block expressions in the block of code.

A context block expression may contain other context block expressions. A context block expression within a context block expression is referred to as nested context block expression. In FIG. 2, context block expression 250 resides within context block expression 240, and is therefore a nested context block expression.

Scope of Contexts

The scope of a context is the set of context block expressions to which the context may be applied when the script is executed. If a context block expression is within the scope of a context, then with respect to the context block expression, the context is said to "have scope over" the context block expression.

The scope of a context that references a multi-expression context block expression includes each expression in the multi-expression context block expression. For example, the scope of context 230 includes both context block expressions 234 and 236.

If a context has scope over a context block expression that has a nested context block expression, then the context also has scope over the nested context block expression. For example, context 240 has scope over the context block expression in which context block expression 250 is nested. Therefore, context 240 has scope over context block expression 250.

A nested context is a context that not only references a nested context block expression, but that also specifies the same user input mode as a context that has scope over the context block expression in which the nested context block is nested. For example, context 244 references nested context block expression 250. Context 240 has scope over the context block expression in which nested context block expression 250 is nested. Context 244 specifies the same user input mode (coord sys) as context 240. Therefore, context 244 is a nested context relative to context 240.

The user input mode state specified by a nested context overrides the user input mode state specified by the contexts relative to which it is nested. Thus, the state of "coord sys" that applies to nested context statement 250 is "local" (the state specified by context 244) not "world" (the mode specified by context 240). After executing a nested context block expression, scope returns to the context referencing the multi-expression context block expression in which nested context block expression resides.

Block 240 in FIG. 2 is used to illustrate the scope of contexts. Referring to FIG. 2, block 240 contains nested context block expression 250 and 260. Context 240 contains a context for the user input mode working coordinate system, specifying that the state for the working coordinate system is WORLD. The scope of context 240 is context block expression 242 and 248.

Context 244 also refers to the working coordinate system, specifying another state for the mode, which is LOCAL. In addition, context 244 references block 250. The scope of context 244 is therefore block 250. When script processor 108 exits block 250 during execution of script 200, scope returns to context 211.

Context block expression 248 also refers to the working coordinate system, specifying another state for the mode, which is the local coordinate system of the graphical component identified by $floor01. In addition, context 246 references context block expression 260. The scope of context 246 is therefore context block expression 250.

Static Contexts

A static context is a context whose scope is the set of context block expressions that are executed until another static context or context prefix is encountered that specifies a new state for the same user input mode. When a context prefix is encountered, the scope of the static context is re-established after completing execution of the context block expression referenced by the context prefix. FIG. 3 includes a script that illustrates static contexts.

Referring to FIG. 3, FIG. 3 depicts a static context 310 according to an embodiment of the present invention. A static prefix has the format:

set<context>

Static context 310 refers to the user input mode center, and specifies that the state of center point is the center of the graphical component identified by amusement_ride.

Context block expression 320 specifies that the graphical component identified by $carousol01 is to be rotated 45 degrees. Because static context 310 has scope, CAD system 100 rotates $carousol01 45 degrees about the center of the amusement_ride.

Context prefix 330 has scope over the multi-expression context block expression 335. Thus, CAD system 100 rotates the graphical component identified by $carousel01 around its own center point, not the center of amusement ride.

The scope of the static context includes the context block expressions 320, 340, and 350. On the other hand, context prefix 330 has scope over multi-expression context block expression 335.

Contexts allow a user to conveniently apply user input modes through a scripting language. Similar to use of user input modes in a GUI, a user conveniently applies a user mode to a set of context block expression by simply referencing the set of context block expressions with a context. Developing scripts with contexts is much simpler than developing work-arounds needed to accommodate the lack of support for user input modes in scripting languages.

The present invention has been illustrated using contexts that correspond to an expository set of user input modes. However, the present invention is not limited to these user input modes. Nor are use of contexts limited to user input modes used for CAD systems, or scripting languages used for CAD Systems.

Prefixing a set of context block expressions to reference the context block expression with a context is but one technique that may be used to reference a set of context block expressions with a context. Other techniques are possible. For example, a context prefix could refer to the name of a function, and thus have scope over the context block expressions of the function. Or, the context may be used as a suffix, referencing the context block expression the context follows.

The present invention is not limited to any particular technique for referencing a context block expression with a context.

Hardware Overview

Figure 4:
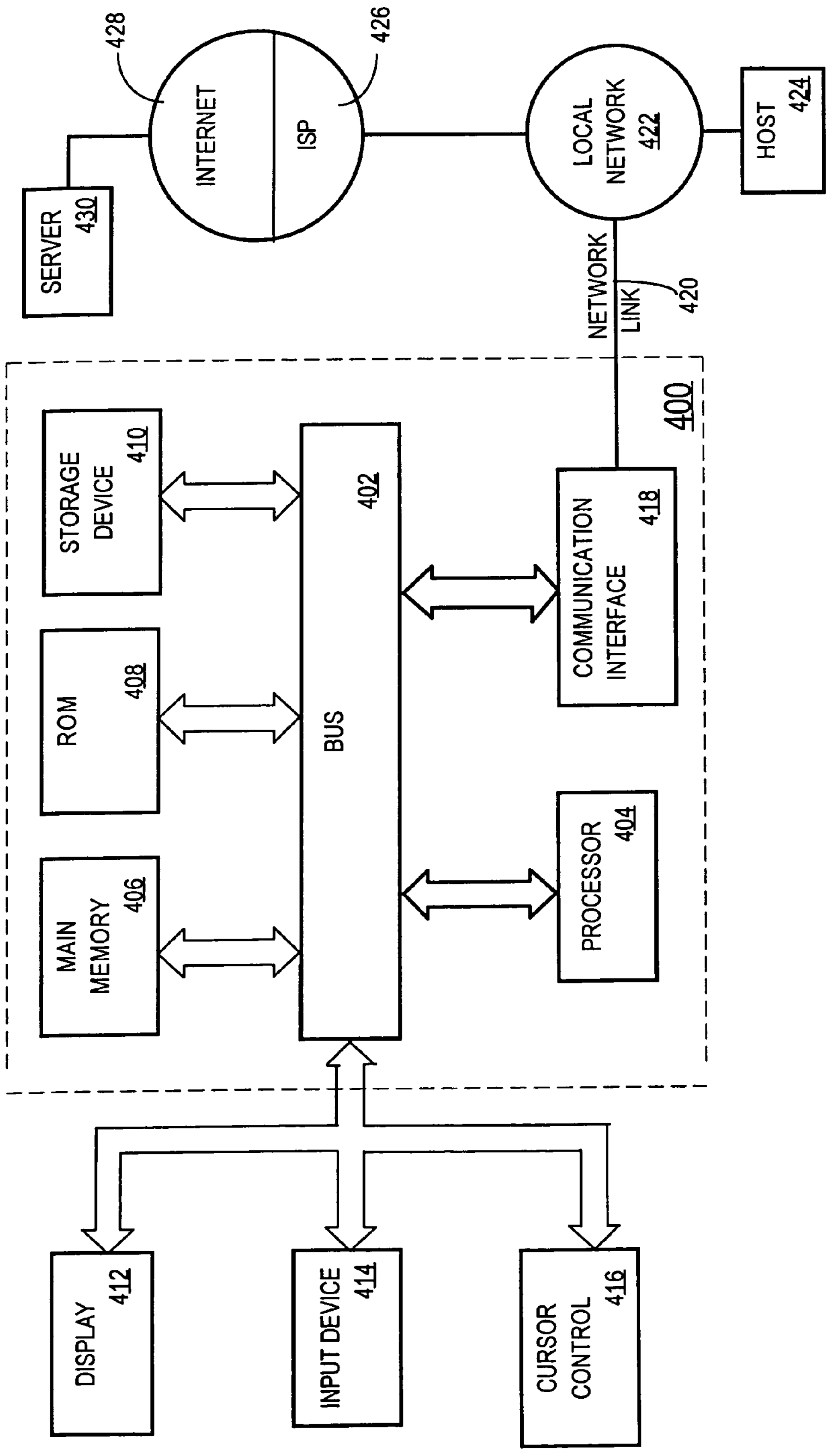
FIG. 4 is a block diagram depicting a computer system upon which an embodiment of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for emulating a sequence of actions performed by a user when interacting with a computer aided design (CAD) application, comprising:

parsing a first instruction including a context prefix and a context block expression, wherein the context prefix specifies one or more contexts and the context block expression specifies one or more operations to perform with respect to one or more graphics components;

parsing a first context of the context prefix into a first user input mode and a first operational state associated with the first user input mode;

parsing a second context of the context prefix into a second user input mode and a second operational state associated with the second user input mode;

setting the CAD application to operate using the first user input mode and the first operational state;

executing the one or more operations specified by the context block expression using the first user input mode and the first operational state;

setting the CAD application to operate using the second user input mode and the second operational state; and executing the one or more operations specified by the context block expression using the second user input mode and the second operational state.

2. The method of claim 1, wherein the first and second contexts are separated by a delimiter within the first instruction.

3. The method of claim 1, wherein a first input mode type associated with the first user input mode is a dimensional coordinate system user input mode type, an animate user input mode type, a center point user input mode type, or a frame time user input mode type, wherein a second input mode type associated with the second user input mode is a dimensional coordinate system user input mode type, an animate user input mode type, a center point user input mode type, or a frame time user input mode type, and wherein the first input mode type is different from the second input mode type.

4. The method of claim 1, wherein the first operational state is associated with a dimensional coordinate system used to process coordinate location parameters specified by the context block expression.

5. The method of claim 4, wherein the first operational state specifies that the dimensional coordinate system is relative to the position of a first graphical component in a three-dimensional model.

6. The method of claim 4, wherein the first operational state specifies that the dimensional coordinate system is relative to a three-dimensional space modeled by a three-dimensional model.

7. The method of claim 1, wherein executing the one or more operations specified by the context block expression emulates a sequence of user actions for generating a computer animation sequence using the CAD application.

8. The method of claim 3, wherein the first input mode type is a dimensional coordinate system user input mode type and the second input mode type is an animate user input mode type.

9. A computer-readable medium, storing instructions that, when executed by a processor, cause the processor to emulate a sequence of actions performed by a user when interacting with a computer aided design (CAD) application, by performing the steps of:

parsing a first instruction including a context prefix and a context block expression, wherein the context prefix specifies one or more contexts and the context block expression specifies one or more operations to perform with respect to one or more graphics components;

parsing a first context of the context prefix into a first user input mode and a first operational state associated with the first user input mode;

parsing a second context of the context prefix into a second user input mode and a second operational state associated with the second user input mode;

setting the CAD application to operate using the first user input mode and the first operational state;

executing the one or more operations specified by the context block expression using the first user input mode and the first operational state;

setting the CAD application to operate using the second user input mode and the second operational state; and executing the one or more operations specified by the context block expression using the second user input mode and the second operational state.

10. The computer-readable medium of claim 9, wherein the first and second contexts are separated by a delimiter within the first instruction.

11. The computer-readable medium of claim 9, wherein a first input mode type associated with the first user input mode is a dimensional coordinate system user input mode type, an animate user input mode type, a center point user input mode type, or a frame time user input mode type, wherein a second input mode type associated with the second user input mode is a dimensional coordinate system user input mode type, an animate user input mode type, a center point user input mode type, or a frame time user input mode type, and wherein the first input mode type is different from the second input mode type.

12. The computer-readable medium of claim 9, wherein the first operational state is associated with a dimensional coordinate system used to process coordinate location parameters specified by the context block expression.

13. The computer-readable medium of claim 12, wherein the first operational state specifies that the dimensional coordinate system is relative to the position of a first graphical component in a three-dimensional model.

14. The computer-readable medium of claim 12, wherein the first operational state specifies that the dimensional coordinate system is relative to a three-dimensional space modeled by a three-dimensional model.

15. The computer-readable medium of claim 9, wherein executing the one or more operations specified by the context block expression emulates a sequence of user actions for generating a computer animation sequence using the CAD application.

16. The computer-readable medium of claim 11, wherein the first input mode type is a dimensional coordinate system user input mode type and the second input mode type is an animate user input mode type.

17. A computing device comprising:

a processor; and a memory configured to store an application that includes instructions that, when executed by the processor, cause the processor to emulate a sequence of actions performed by a user when interacting with a computer aided design (CAD) application, by performing the steps of:

parsing a first instruction including a context prefix and a context block expression, wherein the context prefix specifies one or more contexts and the context block expression specifies one or more operations to perform with respect to one or more graphics components;

parsing a first context of the context prefix into a first user input mode and a first operational state associated with the first user input mode;

parsing a second context of the context prefix into a second user input mode and a second operational state associated with the second user input mode;

setting the CAD application to operate using the first user input mode and the first operational state;

executing the one or more operations specified by the context block expression using the first user input mode and the first operational state;

setting the CAD application to operate using the second user input mode and the second operational state; and executing the one or more operations specified by the context block expression using the second user input mode and the second operational state.

18. The computing device of claim 17, wherein the first and second contexts are separated by a delimiter within the first instruction.

19. The computing device of claim 17, wherein a first input mode type associated with the first user input mode is a dimensional coordinate system user input mode type, an animate user input mode type, a center point user input mode type, or a frame time user input mode type, wherein a second input mode type associated with the second user input mode is a dimensional coordinate system user input mode type, an animate user input mode type, a center point user input mode type, or a frame time user input mode type, and wherein the first input mode type is different from the second input mode type.

20. The computing device of claim 19, wherein the first input mode type is a dimensional coordinate system user input mode type and the second input mode type is an animate user input mode type.

* * * * *